(12) United States Patent
Obogbaimhe et al.

(10) Patent No.: US 12,056,011 B2
(45) Date of Patent: Aug. 6, 2024

(54) COMPUTER-BASED SYSTEMS CONFIGURED FOR DYNAMIC PERFORMANCE SCORING OF SOFTWARE AGENTS AND METHODS OF USE THEREOF

(71) Applicant: Capital One Services, LLC, McLean, VA (US)

(72) Inventors: Emmanuel Obogbaimhe, Fairfax, VA (US); Kadhiresan Kanniyappan, Ashburn, VA (US); Krystan R. Franzen, Mechanicsville, VA (US); Yasawy Rajendraprasad Ravala, Glen Allen, VA (US); Matthew Zheng, Morrisville, NC (US); Matthew Blake Ackard, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 162 days.

(21) Appl. No.: 17/584,659

(22) Filed: Jan. 26, 2022

(65) Prior Publication Data
US 2023/0259426 A1 Aug. 17, 2023

(51) Int. Cl.
*G06F 11/00* (2006.01)
*G06F 11/14* (2006.01)
*G06F 11/30* (2006.01)
*G06F 11/34* (2006.01)

(52) U.S. Cl.
CPC ........ *G06F 11/142* (2013.01); *G06F 11/3051* (2013.01); *G06F 11/3428* (2013.01); *G06F 11/3433* (2013.01)

(58) Field of Classification Search
CPC .............. G06F 11/3409; G06F 11/142; G06F 11/3051; G06F 11/3428; G06F 11/3433
USPC .......................................................... 714/15
See application file for complete search history.

(56) References Cited

U.S. PATENT DOCUMENTS

| | | | |
|---|---|---|---|
| 11,223,552 B1 * | 1/2022 | Anderson | H04L 43/55 |
| 2018/0293120 A1 * | 10/2018 | Arora | G06Q 10/0635 |
| 2022/0308972 A1 * | 9/2022 | Anand | G06Q 10/063112 |
| 2023/0135825 A1 * | 5/2023 | Surisetty | G06F 11/142 714/47.2 |

* cited by examiner

*Primary Examiner* — Jason B Bryan
(74) *Attorney, Agent, or Firm* — Greenberg Traurig, LLP

(57) ABSTRACT

In some embodiments, the present disclosure provides an exemplary method that may include steps of identifying at least one computing specification image within a plurality of computing specification images; monitoring each data agent within the plurality of preinstalled data agents for a predetermined period of time to establish a data agent usage baseline associated with each data agent within the plurality of preinstalled data agents; utilizing a chaos engineering algorithm to dynamically perturb each data agent; calculating a usage test score for each data agent within the plurality of preinstalled data agents; calculating an overall data agent-specific usage score associated with each data agent within the plurality of preinstalled data agents based on the plurality of data agent-specific usage test scores; and rejecting at least one data agent within the plurality of preinstalled data agents from being utilized to launch the instance of the software application.

20 Claims, 10 Drawing Sheets

| Agent | Result | # of Tests Ran | # of Passed Tests | # of Failed Tests | Platform | Test Duration (secs) |
|---|---|---|---|---|---|---|
| nxlog | COMPLIANT | 25 | 25 | 0 | amazon | 8.1150 |

▼ file

320 → 322 → 324 → 326 → 328 → 330 → 332 → 334

FIG. 3D ional steps for calculating an overall data agent-specific usage score associated with each data agent within the plurality of pre-

COMPUTER-BASED SYSTEMS CONFIGURED FOR DYNAMIC PERFORMANCE SCORING OF SOFTWARE AGENTS AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to computer-based systems configured for dynamic performance scoring of software agents and methods of use thereof.

BACKGROUND OF TECHNOLOGY

Typically, a function of launching a plurality of software applications ("software agents") within a computing device requires selecting at least one software application to launch and determining an amount of usage required to launch the at least one software application, which may decrease a level of optimization and efficiency in launching a plurality of software applications at once.

SUMMARY OF DESCRIBED SUBJECT MATTER

In some embodiments, the present disclosure provides an exemplary technically improved computer-based method that includes at least the following steps of identifying, by a processor, at least one computing specification image within a plurality of computing specification images, wherein the computing specification image comprises information associated with a plurality of preinstalled data agents required to launch an instance of a software application; monitoring, by the processor, based at least in part on the at least one identified computing specification image, each data agent within the plurality of preinstalled data agents for a predetermined period of time to establish specification a data agent usage baseline associated with each data agent within the plurality of preinstalled data agents; utilizing, by the processor, a chaos engineering algorithm to dynamically perturb each data agent within the plurality of preinstalled data agents, by at least: i) applying a plurality of predetermined stress tests to each data agent that is unique to each data agent within the plurality of preinstalled data agents, ii) restarting each data agent after the application of each predetermined stress test, and iii) detecting, in response to being restarted, a response from each data agent based on the application of each predetermined stress test; calculating, by the processor, a usage test score for each data agent within the plurality of preinstalled data agents based on a response to each predetermined stress test to obtain a plurality of data agent-specific usage test scores for each data agent within the plurality of preinstalled data agents; calculating, by the processor, an overall data agent-specific usage score associated with each data agent within the plurality of preinstalled data agents based at least in part on the plurality of data agent-specific usage test scores; and rejecting, by the processor, at least one data agent within the plurality of preinstalled data agents from being utilized to launch the instance of the software application when specification the overall data agent-specific usage score is below the data agent usage baseline associated with the at least data agent.

In some embodiments, the present disclosure provides an exemplary technically improved computer-based system that includes at least the following components of at least one processor configured to execute software instructions that cause the at least one processor to perform steps to: identify at least one computing specification image within a plurality of computing specification images, wherein the computing specification image comprises information associated with a plurality of preinstalled data agents required to launch an instance of a software application; monitor based at least in part on the at least one identified computing specification image, each data agent within the plurality of preinstalled data agents for a predetermined period of time to establish specification a data agent usage baseline associated with each data agent within the plurality of preinstalled data agents; utilize a chaos engineering algorithm to dynamically perturb each data agent within the plurality of preinstalled data agents, by at least: i) program instructions to apply a plurality of predetermined stress tests to each data agent that is unique to each data agent within the plurality of preinstalled data agents, ii) program instructions to restart each data agent after the application of each predetermined stress test, and iii) program instructions to detect, in response to being restarted, a response from each data agent based on the application of each predetermined stress test; calculate a usage test score for each data agent within the plurality of preinstalled data agents based on a response to each predetermined stress test to obtain a plurality of data agent-specific usage test scores for each data agent within the plurality of preinstalled data agents; calculate an overall data agent-specific usage score associated with each data agent within the plurality of preinstalled data agents based at least in part on the plurality of data agent-specific usage test scores; and reject at least one data agent within the plurality of preinstalled data agents from being utilized to launch the instance of the software application when specification the overall data agent-specific usage score is below the data agent usage baseline associated with the at least data agent.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 3A-3D depict exemplary graphs of an exemplary computer-based system/platform for generating an external database to store a plurality of usage scores associated with the plurality of data agents, in accordance with one or more embodiments of the present disclosure.

DETAILED DESCRIPTION

Figure 1:
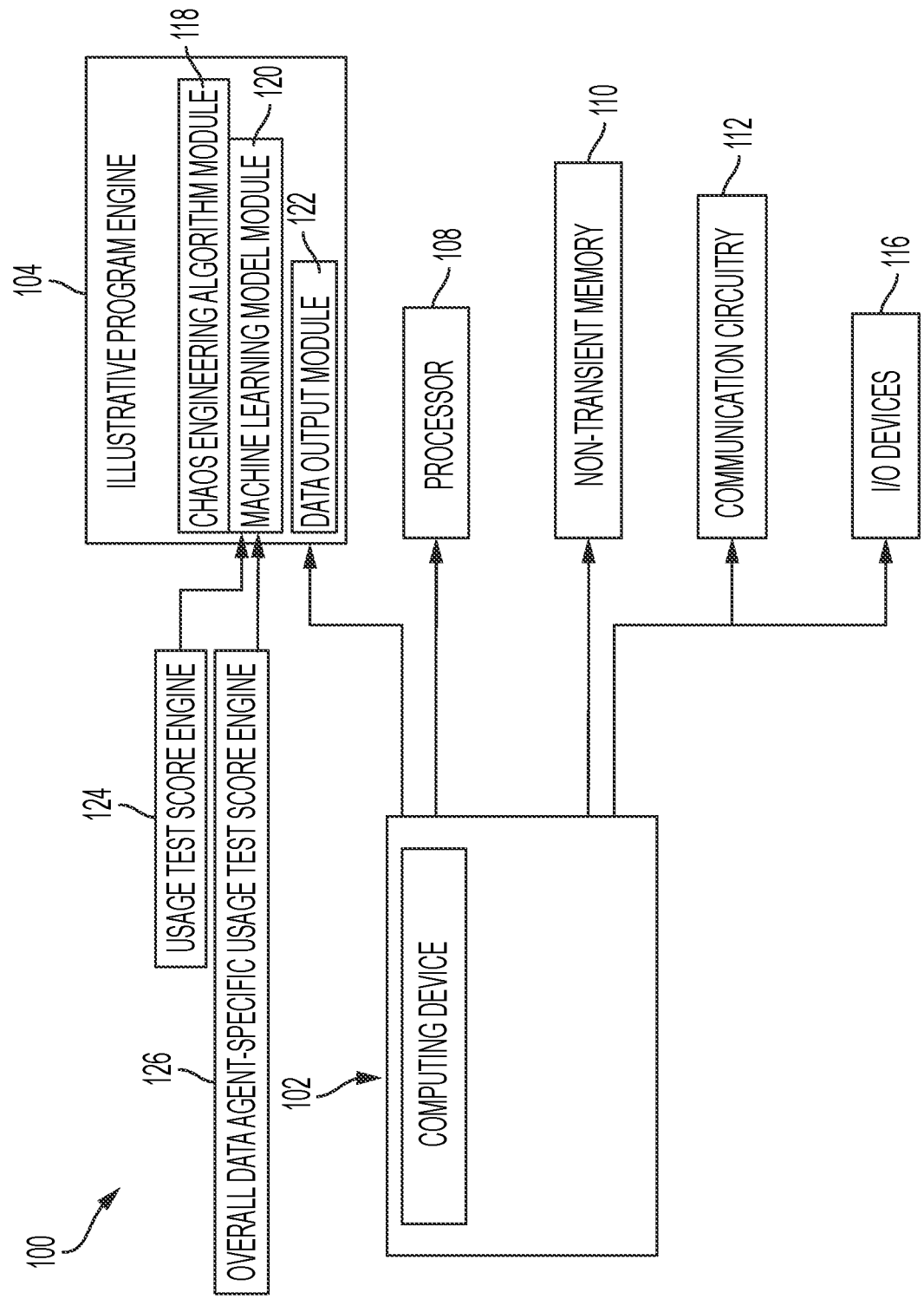
FIG. 1 is a block diagram show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

At least some embodiments of the present disclosure provide technological solution(s) to a technological computer-centered problem associated with simultaneously launching a plurality of software applications on a computing device. The technological computer-centered problem associated with simultaneous launching of the plurality of software applications typically arises primarily due to an unknown reduction in performance of the computing device and/or an unknown amount of usage required to launch each software application within the computing device based on an amount of data associated with the launch of each software application from the plurality of software applications. In some embodiments, the present disclosure may utilize a chaos engineering algorithm to dynamically perturb a plurality of data agents associated with the launching of the plurality of software applications on the computing device. In some instances, the present disclosure may utilize the chaos engineering algorithm to dynamically perturb the plurality of data agents to investigate various metrics to improve the optimization of simultaneously launching the plurality of software applications on the computing device based at least in part on machine learning about the unknown usage and/or reduction in performance associated with the simultaneous launch of the plurality of software applications. In some embodiments, the present disclosure provides a computer-centric technological solution that may calculate a usage test score for each data agent within the plurality of data agents associated with the launching of the plurality of software applications on the computing device based on a response to a plurality of predetermined stress tests to determine which software application(s) may affect the computing device the most when launching. In some instances, the computer-centric technological solution may include calculating an overall data agent-specific usage score associate with each data agent within the plurality of data agents and rejecting at least one data agent from launching a software application based on the overall data agent-specific usage score failing to meet a data agent usage baseline.

FIG. 1 depicts a block diagram of an exemplary computer-based system and platform for dynamically mapping a virtual account number to an actual financial account associated with a user, in accordance with at least one embodiment.

In some embodiments, an illustrative computing system pf the present disclosure 100 may include a computing device 102 associated with a user and an illustrative program engine 104. In some embodiments, the program 104 may be stored on the computing device 102. In some embodiments, the illustrative program engine 104 may reside on a server computing device 106 (not shown). In some embodiments, the computing device 102 may include a processor 108, a non-transient memory 110, a communication circuitry 112 for communicating over a communication network 114 (not shown), and input and/or output (I/O) devices 116 such as a keyboard, mouse, a touchscreen, and/or a display, for example.

In some embodiments, the illustrative program engine 104 may be configured to instruct the processor 108 to execute one or more software modules such as, without limitations, a chaos engineering algorithm module 118, a machine learning module 120, and/or a data output module 122.

In some embodiments, an exemplary chaos engineering algorithm module 118, of the present disclosure, utilizes at least one machine learning algorithm described herein, to dynamically perturb a plurality of data agents associated with the simultaneous launching of multiple software applications. In some embodiments, the exemplary chaos engineering algorithm module 118 may identify at least one computing specification image within a plurality of computing specification images. Typically, the simultaneous launching of software applications on the computing device 102 requires an unknown amount of usage and/or may hinder the performance of the computing device 102 to perform various functions. In some instances, the simultaneous launching of software applications may be associated with a plurality of preinstalled data agents, where each data agent may be associated with launching at least one software application. In some instances, the plurality of preinstalled agents may be used to calculate a plurality of usage scores. In some embodiments, the computing specification image may refer to information associated with a plurality of preinstalled data agents, where the exemplary chaos engineering algorithm module 118 utilizes the plurality of preinstalled data agents to launch an instance of a software application on the computing device 102. In some embodiments, the computing specification image may be associated with the server computing device 106. In some embodiments, the exemplary chaos engineering algorithm module 118 may monitor each data agent within the plurality of preinstalled data agents for a predetermined period of time to establish a data agent usage baseline associated with each data agent within the plurality of preinstalled data agents. In some embodiments, the exemplary chaos engineering algorithm module 118 may monitor a plurality of performance metrics for a predetermined period of time for each data agent within the plurality of preinstalled data agents. For example. the performance metrics may refer to CPU utilization metric, memory usage metric, and data latency metric. In some embodiments, the exemplary chaos engineering algorithm module 118 may dynamically perturb each data agent within the plurality of data agents by applying a plurality of predetermined stress tests to each data agent that is unique to each data agent within the plurality of data agents; restarting each data agent after the application of each predetermined stress test of the plurality of predetermined stress tests; and detecting, in response to restarting each data agent, a response from each data agent based on the application of each predetermined stress test. In some embodiments, the exemplary chaos engineering algorithm module 118 may dynamically perturb each data agent within the plurality of preinstalled data agents by applying an endpoint unavailability test, wherein the endpoint availability test places at least one endpoint associated the at least one data agent in an offline status.

In some embodiments, the exemplary chaos engineering algorithm module 118 may calculate a usage test score for each data agent within the plurality of preinstalled agents based at least in part on a response to each predetermined test. In some embodiments, the exemplary chaos engineering algorithm module 118 may utilize the calculated usage test score for each data agent within the plurality of data agents to obtain a plurality of data agent-specific usage test scores for each data agent within the plurality of data agents. In some embodiments, the exemplary chaos engineering algorithm module 118 may calculate an overall data agent-specific usage score associated with each data agent within the plurality of data agents based at least in part on the plurality of data-agent specific usage test scores. In some embodiments, the exemplary chaos engineering algorithm module 118 may reject at least one data agent within the plurality of data agents from being utilized to launch the instance of the software application on the computing device 102 when the overall data agent-specific usage score is below the data agent usage baseline associated with the at least data agent.

In some embodiments, the exemplary chaos engineering algorithm module 118 may generate or instruct to generate a database to store the plurality of data agents and respective calculated data agent-specific usage scores of each data agent of the plurality of data agents. In some embodiments, the exemplary chaos engineering algorithm module 118 may instruct the computing device 102 to display a generated database of the plurality of data agents. In some embodiment, the generated database may refer to an order of the plurality of data agents by each respective data agent-specific usage score.

In some embodiments, the present disclosure describes systems for utilizing the machine learning module 120 for calculating a plurality of usage scores associated with each data agent within the plurality of preinstalled data agents by utilizing a usage test score engine 124 and an overall data agent-specific usage score engine 126 to calculate the plurality of usage scores, where the input(s) may be a plurality of responses based on the application of the plurality of predetermined stress tests. In some embodiments, the machine learning module 120 may receive a plurality of detected responses associated with the application of the plurality of predetermined stress test as input. In some embodiments, the machine learning module 120 may utilize the usage test score engine 124 to calculate the usage test score for each data agent within the plurality of preinstalled data agents based on the detected response to each predetermined stress test. In some embodiments, the machine learning module 120 may utilize the usage test score engine 124 to obtain a plurality of data agent-specific usage test scores for each data agent within the plurality of preinstalled data agents. In some embodiments, the machine learning module 120 may utilize the overall data agent-specific usage score engine 126 to calculate an overall data agent-specific usage score associated with each data agent within the plurality of data agents based on, at least in part, on an output of the usage test score engine 124. In some embodiments, the machine learning module 120 may reject at least one data agent within the plurality of preinstalled data agents from being utilizes to launch the instance of software applications on the computing device 102. In some embodiments, output of the machine learning module 120 may be the plurality of usage scores associated with each data agent within the plurality of preinstalled data agents. In some embodiments, the output of the machine learning module 120 may be the calculated usage test score based on the utilization of the usage test score engine 124. In some embodiments, the output of the machine learning module 120 may be the calculated overall data agent-specific usage score based on the utilization of the overall data agent-specific usage score engine 126.

In some embodiments, the data output module 122 may reject at least one data agent within the plurality of preinstalled data agents from being utilized to launch the instance of the software application when the overall data agent-specific score is below the data agent usage baseline associated with the at least data agent. In some embodiments, the data output module 122 may generate a database to store the plurality of preinstalled data agents and respective calculated data agent-specific usage scores of each data agent in the plurality of preinstalled data agents. In some embodiments, the data output module 122 may display the generated database of the plurality of preinstalled data agents. In some embodiments, the generated database may refer to an order associated with the plurality of data agents based on each respective data agent-specific usage score.

In some embodiments, the illustrative program engine 104 may identify at least one computing specification image within a plurality of computing specification images, where the computing specification image includes information associated with a plurality of preinstalled data agents required to launch an instance of a software application. In some embodiments, the computing specification image may refer to functional specifications of computing power associated with the computing device 102 depicted via an image. In some embodiments, the plurality of data agents can be installed at a later period of time. In some embodiments, the illustrative program engine 104 may monitor each data agent within the plurality of preinstalled data agents for a predetermined period of time to establish a data agent usage baseline associated with each data agent within the plurality of preinstalled data agents based at least in part on the at least one identified computing specification image. In some embodiments, the illustrative program engine 104 may dynamically perturb each data agent within the plurality of preinstalled data agents by applying a plurality of predetermined stress tests to each data agent that is unique to each data agent within the plurality of preinstalled data agents; restarting each data agent after the application of each predetermined stress test of the plurality of predetermined stress tests; and detecting, in response to restarting each data agent, a response from each data agent based on the application of each predetermined stress test. In some embodiments, the illustrative program engine 104 may utilize the usage test score engine 124 to calculate a usage test score for each data agent within the plurality of preinstalled data agents based on a response to each predetermined stress test to obtain a plurality of data agent-specific usage test scores for each data agent within the plurality of preinstalled data agents. In some embodiments, the illustrative program engine 104 may utilize the overall data agent-specific usage score engine 126 to calculate an overall data agent-specific usage score associated with each data agent within the plurality of preinstalled data agents based at least in part on the plurality of data agent-specific usage test scores. In some embodiments, the illustrative program engine 104 may reject at least one data agent within the plurality of preinstalled data agents from being utilized to launch the instance of the software application on the computing device 102 when the overall data agent-specific usage score is below the data agent usage baseline associated with the at least data agent.

In some embodiments, the non-transient memory 110 may store the detected responses from each data agent based on the application of each predetermined stress test. In some embodiments, the non-transient memory 110 may store the plurality of usage scores as output of the machine learning module 120 utilizing the exemplary chaos engineering algorithm module 118.

Figure 2:
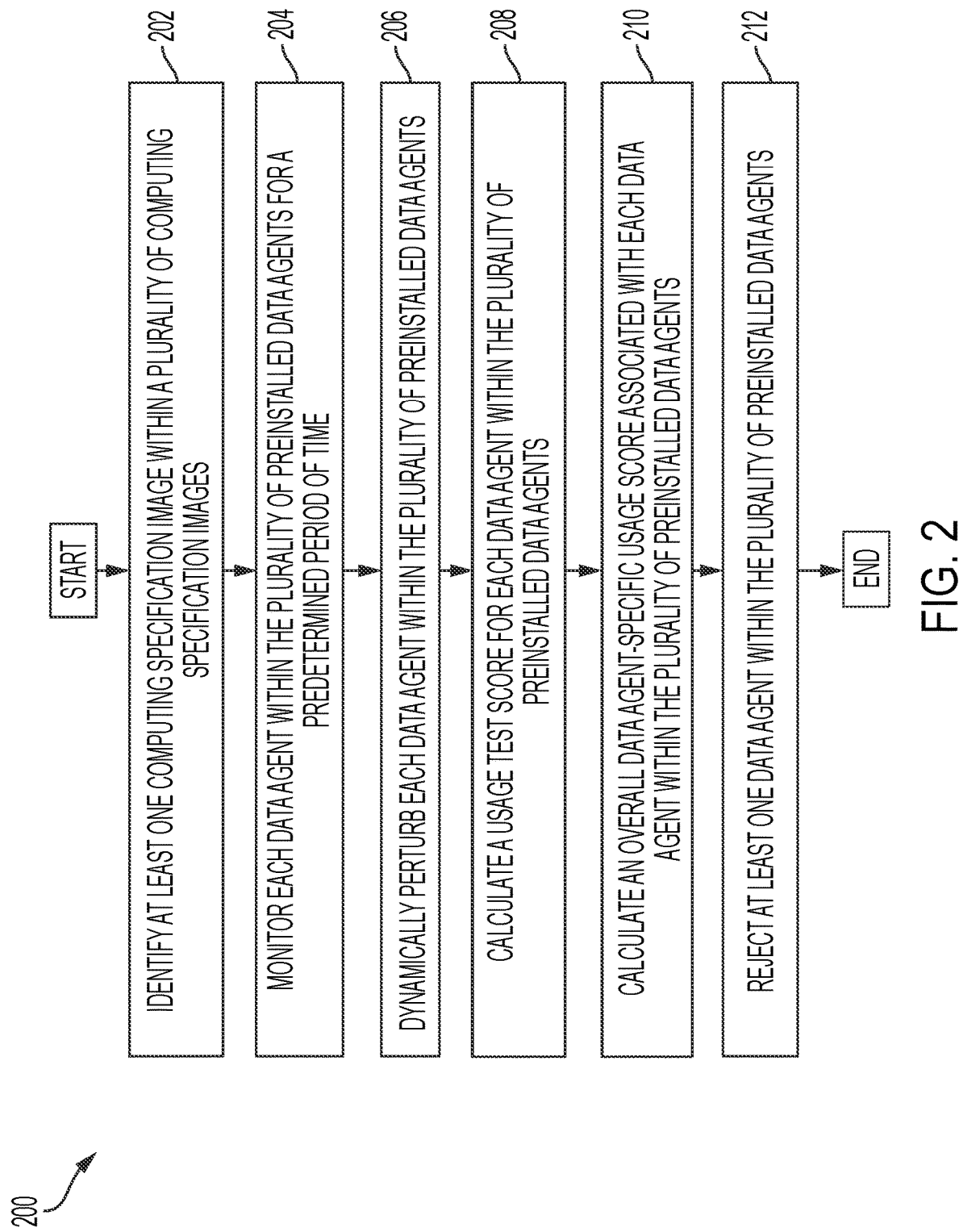
FIG. 2 is a flowchart illustrating operat ciated with a plurality of data agents, in accordance with one or more embodiments of the present disclosure.

FIG. 2 is a flowchart 200 illustrating operational steps for calculating an overall data agent-specific usage score associated with a plurality of data agents, in accordance with one or more embodiments of the present disclosure.

In step 202, the illustrative program engine 104 within the computing device 102 may be programmed to identify at least one computing specification image within a plurality of computing specification images. In some embodiments, the computing specification image may refer to information associated with a plurality of preinstalled data agents required to launch an instance of a software application on the computing device 102. For example, the computing specification image may detail the amount of memory storage the launching of the software application will require while simultaneously displaying the current available amount of memory storage associated with the computing device 102.

In step 204, the illustrative program engine 104 may be programmed to monitor each data agent within the plurality of preinstalled data agents for a predetermined period of time. In some embodiments, the illustrative program engine 104 may monitor each data agent within the plurality of preinstalled data agents based at least in part on the at least one computing specification image. In some embodiments, the illustrative program engine 104 may monitor each data agent within the plurality of preinstalled data agents to establish a data agent usage baseline associated with each data agent within the plurality of preinstalled data agents. In some embodiments, the data agent usage baseline may refer to a predetermined usage threshold associated with an analysis of a utilization of the chaos engineering algorithm module 118 to determine usage ability of each data agent.

In step 206, the illustrative program engine 104 may be programmed to dynamically perturb each data agent within the plurality of preinstalled data agents. In some embodiments, the illustrative program engine 104 may dynamically perturb each data agent within the plurality of preinstalled data agents by utilizing the chaos engineering algorithm module 118 to apply a plurality of predetermined stress tests to each data agent that is unique to each data agent within the plurality of preinstalled data agents; restart each data agent after the application of each predetermined stress test; and detect, in response to being restarted, a response from each data agent based on the application of each predetermined stress test. Examples of the plurality of predetermined stress tests, without limitation, are provided in FIG. 3A-3D. In some embodiments, the illustrative program engine 104 may dynamically perturb each data agent within the plurality of preinstalled data agents by utilizing the chaos engineering algorithm module 118 to apply an endpoint unavailability test. In some embodiments, the endpoint unavailability test may refer to placing at least one endpoint associated the at least one data agent in an offline status.

In step 208, the illustrative program engine 104 may be programmed to calculate a usage test score for each data agent within the plurality of preinstalled data agents. In some embodiments, the illustrative program engine 104 may calculate the usage test score for each data agent within the plurality of preinstalled data agents based on a response to each predetermined stress test to obtain a plurality of data agent-specific usage test scores for each data agent within the plurality of preinstalled data agents. In some embodiments, the illustrative program engine 104 may utilize the machine learning module 120 to calculate the usage test score for each data agent within the plurality of preinstalled data agents. In some embodiments, the illustrative program engine 104 may utilize the usage test score engine 124 to calculate the usage test score for each data agent within the plurality of preinstalled data agents.

In step 210, the illustrative program engine 104 may be programmed to calculate an overall data agent-specific usage score associated with each data agent within the plurality of preinstalled data agents. In some embodiments, the illustrative program engine 104 may calculate the overall data agent-specific usage score associated with each data agent within the plurality of preinstalled data agents based on the plurality of data agent-specific usage test scores. In some embodiments, the illustrative program engine 104 may calculate the overall data agent-specific usage score associated with each data agent within the plurality of preinstalled data agents based on the output of the usage test score engine 124. In some embodiments, the illustrative program engine 104 may utilize the machine learning module 120 to calculate the overall data agent-specific usage score associated with each data agent within the plurality of preinstalled data agents. In some embodiments, the illustrative program engine 104 may utilize the overall data agent-specific usage score engine 126 to calculate the overall data agent-specific usage score associated with each data agent within the plurality of preinstalled data agents.

In step 212, the illustrative program engine 104 may be programmed to reject at least one data agent within the plurality of preinstalled data agents from being utilized to launch the instance of the software application. In some embodiments, the illustrative program engine 104 may reject the at least one data agent within the plurality of preinstalled data agents from being utilized to launch the instance of the software application on the computing device 102 when the overall data agent-specific usage score is below the data agent usage baseline associated with the at least data agent.

Figure 3A:
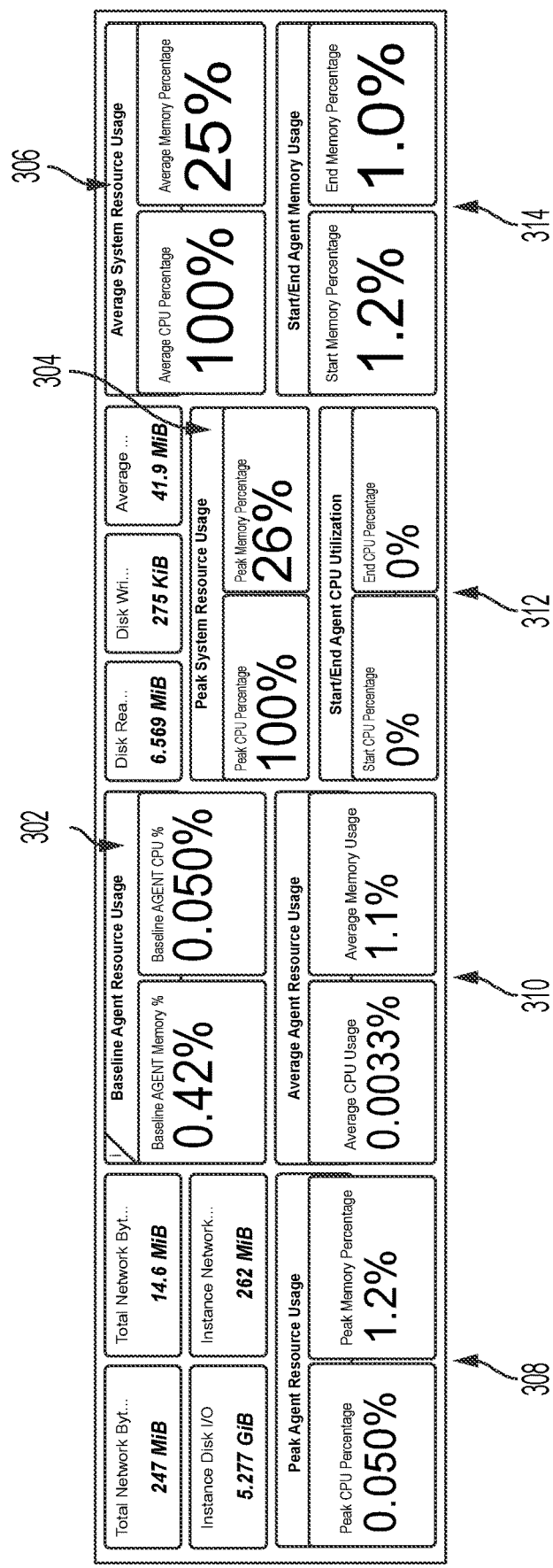

FIG. 3A depicts a plurality of calculated usage test scores associated with the application of the plurality of predetermined stress test by the exemplary chaos engineering algorithm module 118 via the usage test score engine 124. In FIG. 3A, a baseline agent resource usage test score 302 is provided for a first data agent associated with usage of the non-transient memory 110 of the computing device 102 and a second data agent associated with usage of the processor 108 of the computing device 102. The exemplary chaos engineering algorithm module 118 via the usage test score engine 124 provides a peak system resource usage test score 304 for the first data agent associated with the usage of the non-transient memory 110 of the computing device 102 and the second data agent associated with usage of the processor 108 of the computing device 102. An average system resource usage test score 306 is provided for the first data agent associated with the usage of the non-transient memory 110 of the computing device 102 and the second data agent associated with usage of the processor 108 of the computing device 102. A peak agent resource usage test score 308 is provided for the first data agent associated with the usage of the non-transient memory 110 of the computing device 102 and the second data agent associated with usage of the processor 108 of the computing device 102. An average agent resource usage test score 310 is provided for the first data agent associated with the usage of the non-transient memory 110 of the computing device 102 and the second data agent associated with usage of the processor 108 of the computing device 102. Start and end agent utilization test scores 312, 314 are provided for the first data agent associated with the usage of the non-transient memory 110 of the computing device 102 and the second data agent associated with usage of the processor 108 of the computing device 102.

Figure 3B:
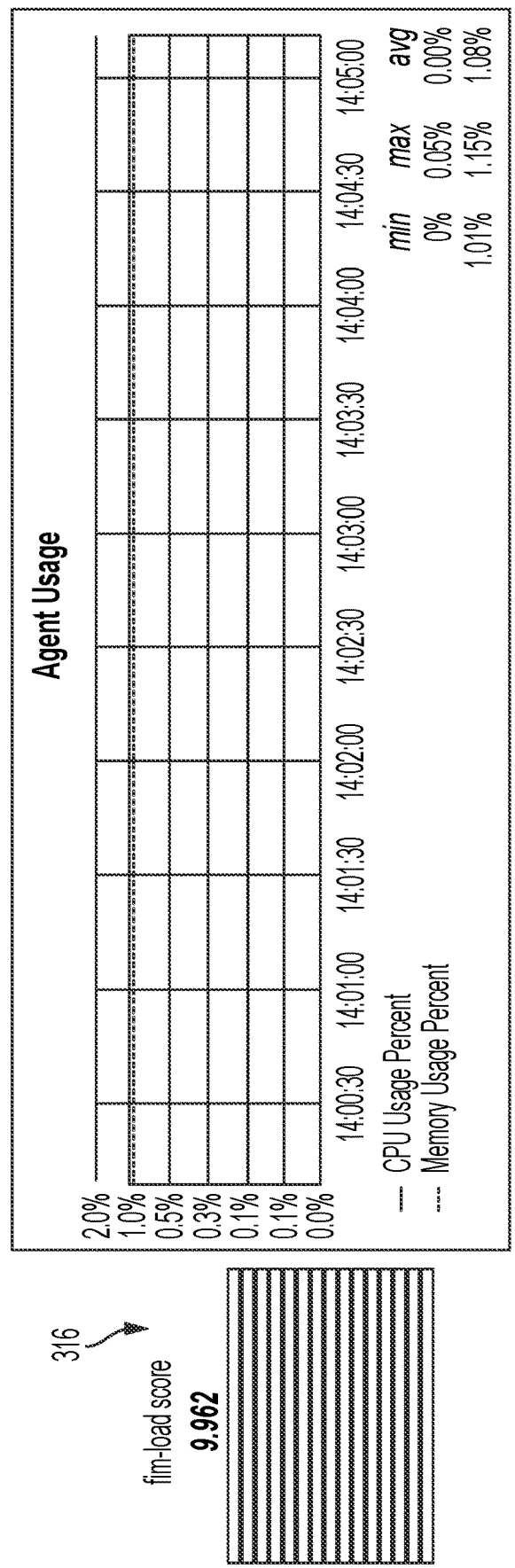

FIG. 3B depicts a calculated overall data agent-specific usage score associated with each data agent within the plurality of preinstalled data agents based on the utilization of the exemplary chaos engineering algorithm module 118 via the overall data agent-specific usage score engine 126. In FIG. 3B, a functional independence measure-load ("fim-load") test score 316 is provided as the overall data agent specific usage score associated with at least one data agent within the plurality of preinstalled data agent. The fim-load test score 316 is based on the plurality of detected responses associated with the application of the plurality of predetermined stress tests used to dynamically perturb the data agent.

Figure 3C:
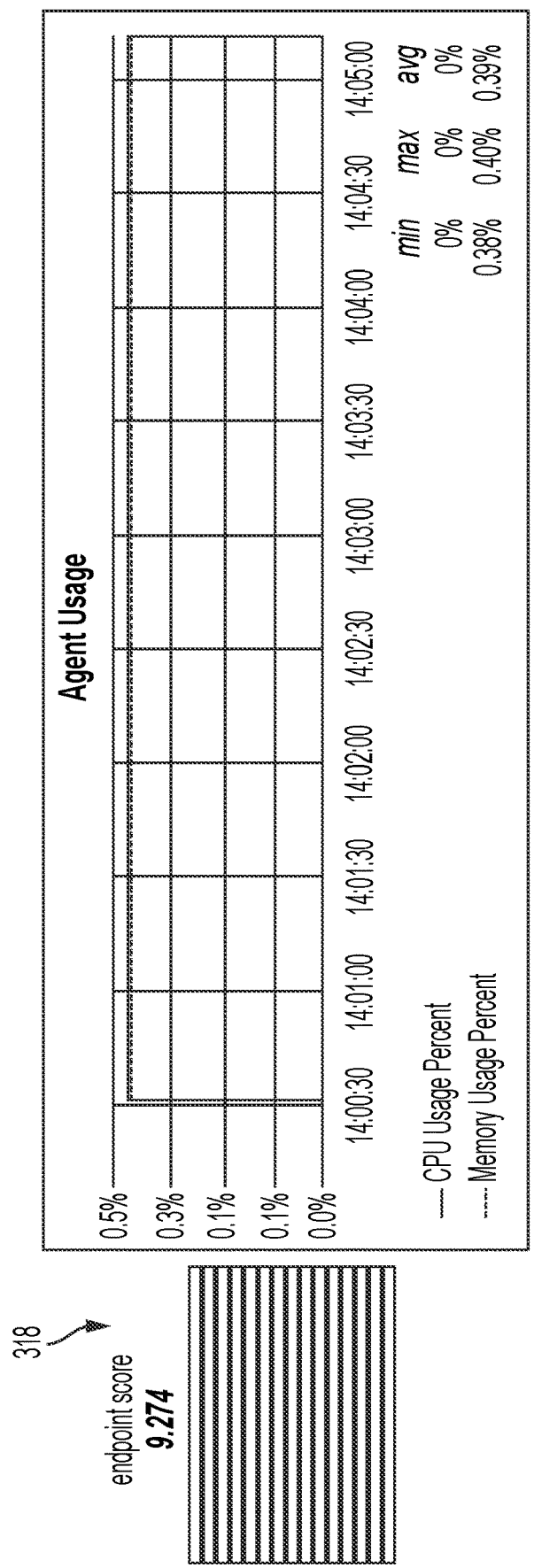

FIG. 3C depicts an alternative calculated overall data agent-specific usage score associated with each data agent within the plurality of preinstalled data agents based on the utilization of the exemplary chaos engineering algorithm module 118 to dynamically perturb each data agent. In some embodiments, an endpoint usage score 318 may be provided as the alternate calculated overall data agent-specific usage score associated with each data agent within the plurality of preinstalled data agents FIG. 3D depicts a data record and/or data vector within the generated database 320 to store the plurality of preinstalled data agents and respective calculated data agent-specific usage scores of each data agent in the plurality of preinstalled data agent. The generated database 320 identifies at least one data agent 322, at least one result 324 of at least one dynamic perturbation associated with the data agent 322, a number identifying how many dynamic perturbations 326 have been performed with the data agent 322, a number identifying successfully detected responses 328 associated with the plurality of dynamic perturbations performed with the data agent 322, a number associated identifying failed detected responses 330 associated with the plurality of dynamic perturbations performed with the data agent 322, a platform identifier 332, identifying an entity or enterprise platform utilized to perform the plurality of dynamic perturbations associated with the data agent 322, and a test duration 334 identifying an overall duration of all dynamic perturbations 326 associated with the data agent 322.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11 ™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile; ™ (20) Microsoft DirectX™; (21) .NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the exemplary ASR system of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent tests for software agents that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary ASR system of the present disclosure, utilizing at least one machine-learning model described herein, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

The aforementioned examples are, of course, illustrative and not restrictive.

Figure 4:
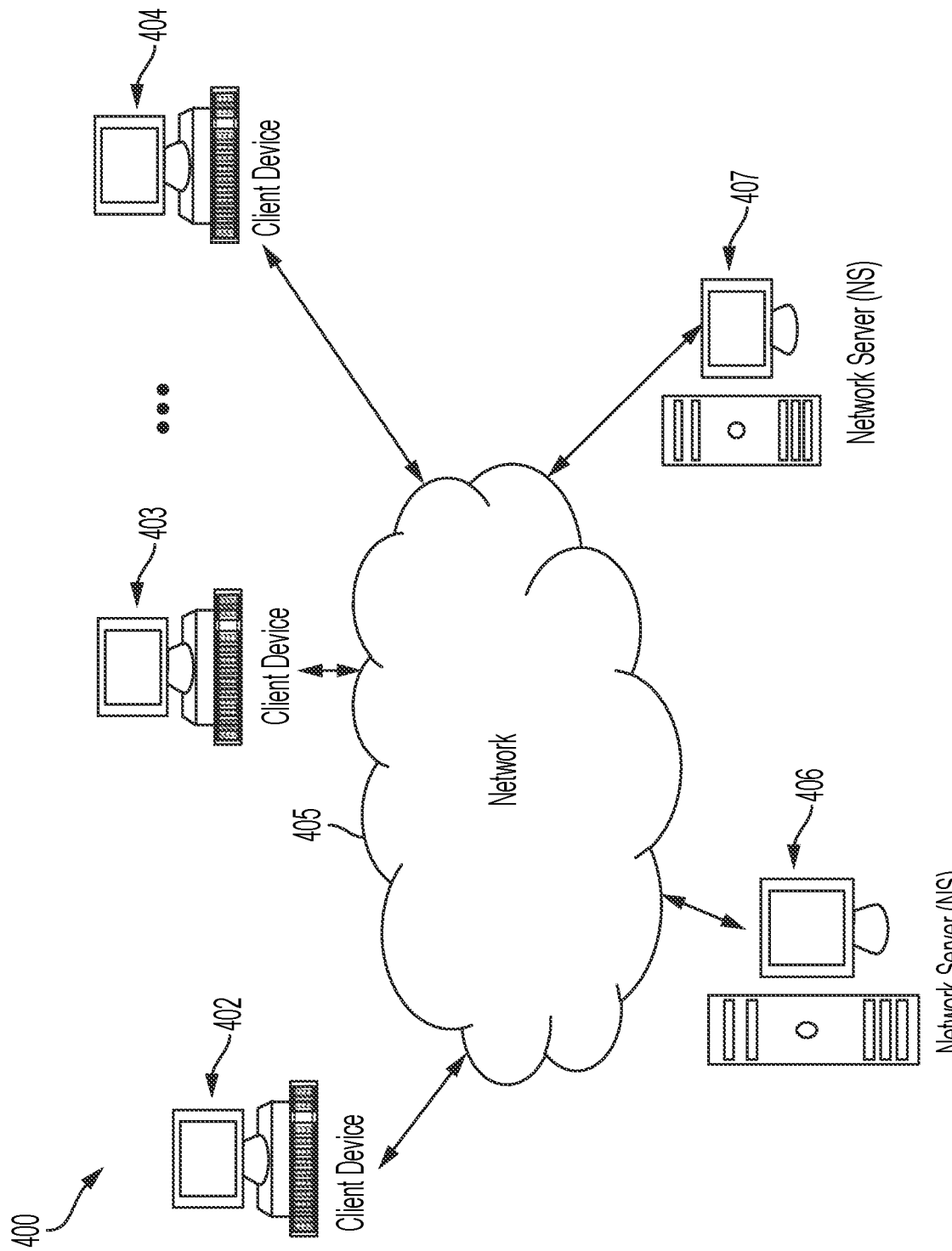
FIG. 4 depicts a block diagram of an exemplary computer-based system/platform in accordance with one or more embodiments of the present disclosure.

FIG. 4 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage launching a plurality of software applications within a computing device 102, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 400 may be configured to manage the exemplary chaos engineering algorithm module 118 of the present disclosure, utilizing at least one machine-learning model described herein.

In some embodiments, referring to FIG. 4, members 402-404 (e.g., clients) of the exemplary computer-based system/platform 400 may include virtually any computing device capable of simultaneously launching a plurality of software applications via a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may launch one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary chaos engineering algorithm module 118 of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to launch software applications and dynamically perform a plurality of predetermined stress tests.

Figure 5:
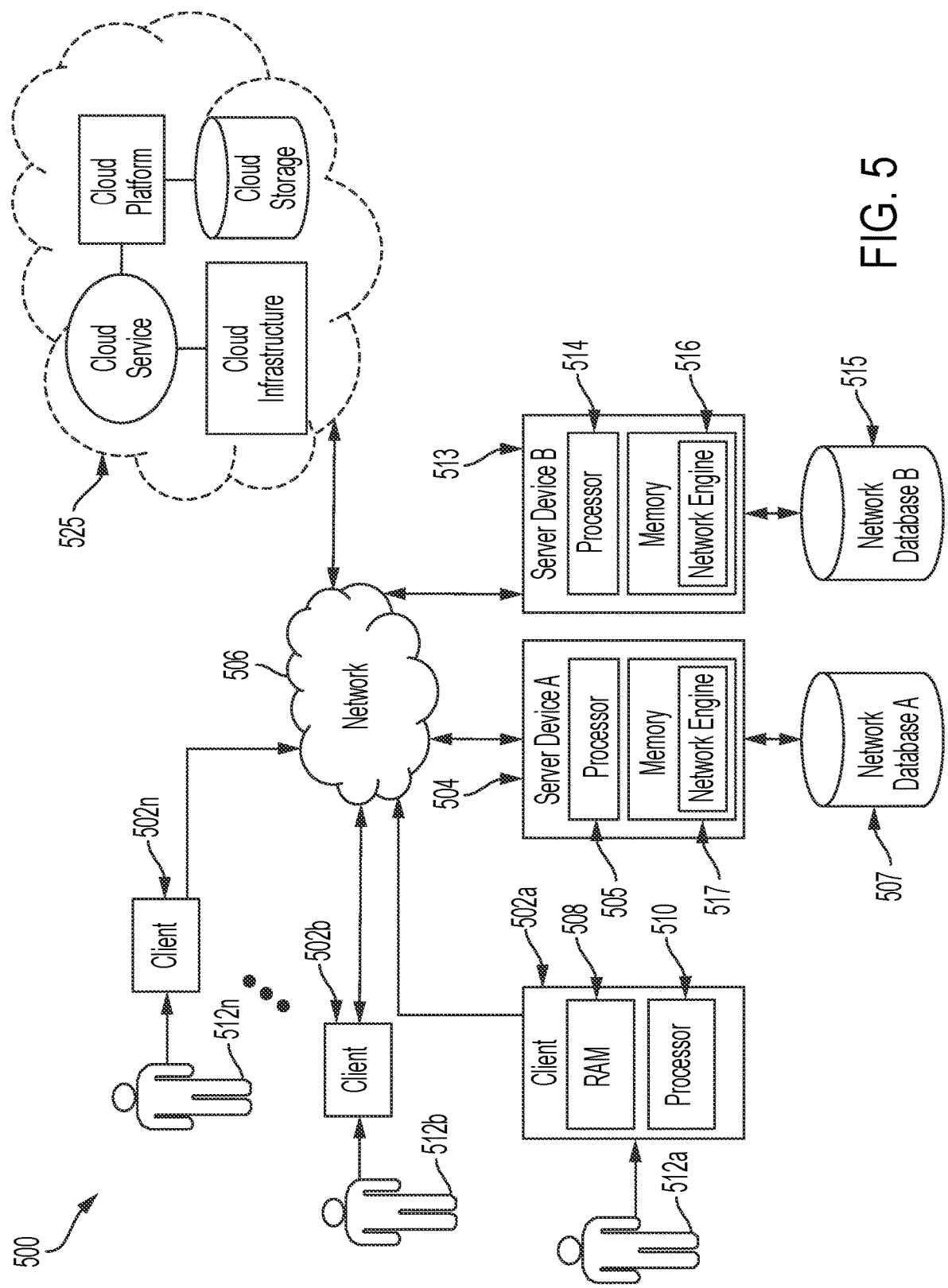
FIG. 5 depicts a block diagram of another exemplary computer-based system/platform in accordance with one or more embodiments of the present disclosure.

FIG. 5 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™, Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 5, exemplary server devices 504 and 513 may be also coupled to the network 506. Exemplary server device 504 may include a processor 505 coupled to a memory that stores a network engine 517. Exemplary server device 513 may include a processor 514 coupled to a memory 516 that stores a network engine. In some embodiments, one or more member computing devices 502a through 502n may be mobile clients. As shown in FIG. 5, the network 506 may be coupled to a cloud computing/architecture(s) 525. The cloud computing/architecture(s) 525 may include a cloud service coupled to a cloud infrastructure and a cloud platform, where the cloud platform may be coupled to a cloud storage.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
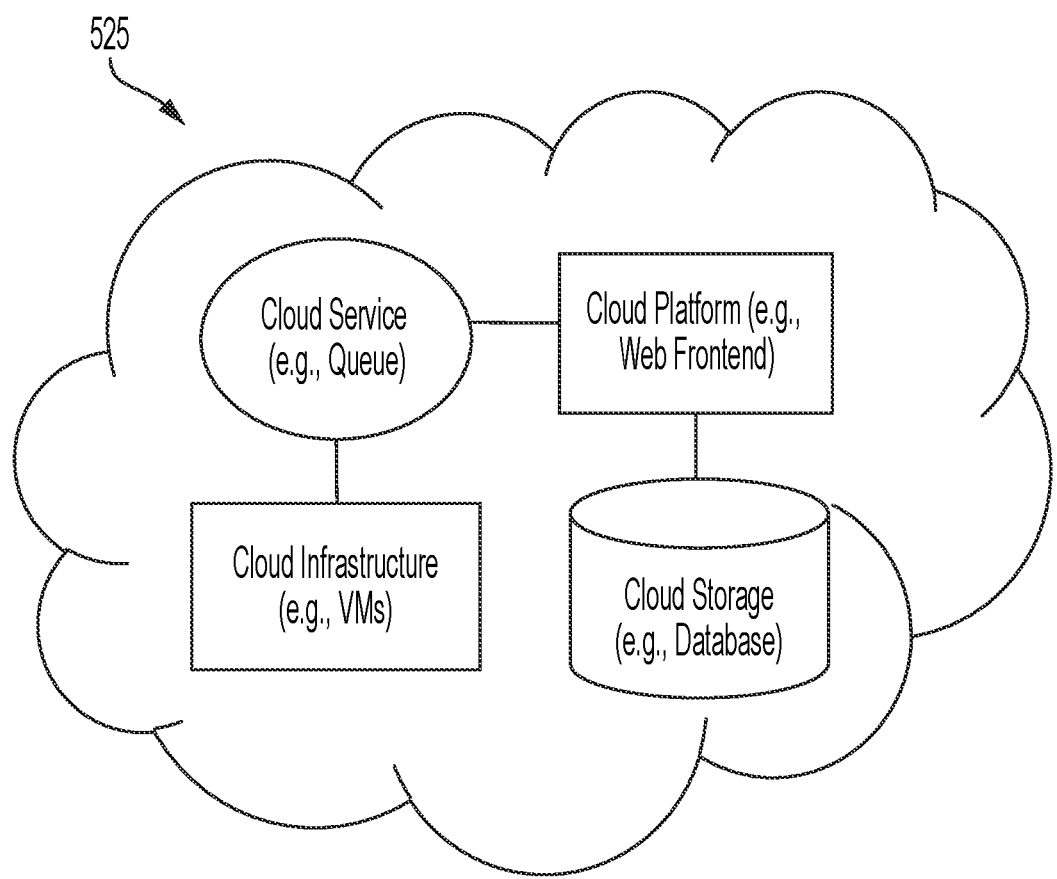
FIGS. 6 and 7 are diagrams illustrating implementations of cloud computing architecture/aspects with respect to which the disclosed technology may be specifically configured to operate, in accordance with one or more embodiments of the present disclosure.
Figure 7:
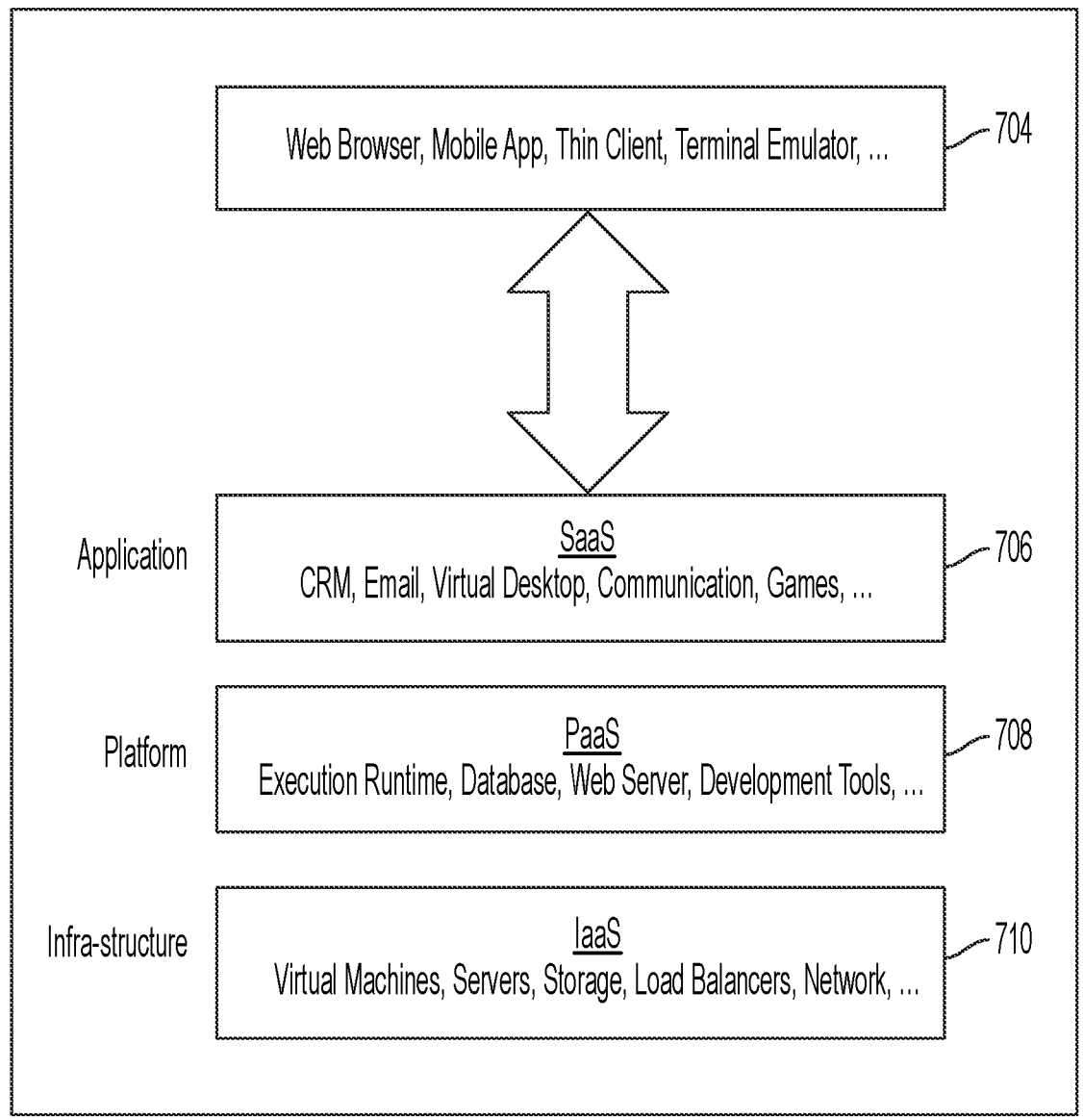

FIG. 6 and FIG. 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 6 illustrates an expanded view of the cloud computing/architecture(s) 525 found in FIG. 5. FIG. 7 illustrates the exemplary inventive computer-based components of the present disclosure may be specifically configured to operate in the cloud computing/architecture 525 as a source database 704, where the source database 704 may be a web browser. a mobile application, a thin client, and a terminal emulator. In FIG. 7, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS) 710, platform as a service (PaaS) 708, and/or software as a service (SaaS) 706.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

1. A method may include:
   identifying, by a processor, at least one computing specification image within a plurality of computing specification images, where the computing specification image includes information associated with a plurality of preinstalled data agents required to launch an instance of a software application;
   monitoring, by the processor, based at least in part on the at least one identified computing specification image, each data agent within the plurality of preinstalled data agents for a predetermined period of time to establish a data agent usage baseline associated with each data agent within the plurality of preinstalled data agents;
   utilizing, by the processor, a chaos engineering algorithm to dynamically perturb each data agent within the plurality of preinstalled data agents, by at least:
   i) applying a plurality of predetermined stress tests to each data agent that is unique to each data agent within the plurality of preinstalled data agents,
   ii) restarting each data agent after the application of each predetermined stress test, and
   iii) detecting, in response to being restarted, a response from each data agent based on the application of each predetermined stress test;
   calculating, by the processor, a usage test score for each data agent within the plurality of preinstalled data agents based on a response to each predetermined stress test to obtain a plurality of data agent-specific usage test scores for each data agent within the plurality of preinstalled data agents;
   calculating, by the processor, an overall data agent-specific usage score associated with each data agent within the plurality of preinstalled data agents based at least in part on the plurality of data agent-specific usage test scores; and
   rejecting, by the processor, at least one data agent within the plurality of preinstalled data agents from being utilized to launch the instance of the software application when the overall data agent-specific usage score is below the data agent usage baseline associated with the at least data agent.

2. The method according to clause 1, where at least one computing specification image within a plurality of computing specification images is associated with at least one server computing device.

3. The method according to clause 1 or 2, where the plurality of preinstalled data agents comprises a plurality of instructions stored within an external data source to launch at least one software application on a computing device.

4. The method according to clause 1, 2 or 3, where monitoring each data agent within the plurality of preinstalled data agents for the predetermined period of time includes monitoring a plurality of performance metrics for a predetermined period of time for each data agent within the plurality of preinstalled data agents, where the plurality of performance metrics includes CPU utilization, memory usage, and data latency measurements.

5. The method according to clause 1, 2, 3 or 4, where utilizing the chaos engineering algorithm to dynamically perturb each data agent includes applying an endpoint unavailability test, where the endpoint availability test places at least one endpoint associated the at least one data agent in an offline status.

6. The method according to clause 1, 2, 3, 4 or 5, where the data agent usage baseline includes a predetermined usage threshold associated with an analysis of a utilization of the chaos engineering algorithm to determine usage ability of each data agent.

7. The method according to clause 1, 2, 3, 4, 5 or 6, where the overall data agent-specific usage score associated with each data agent includes a usage score that is a value with a minimum value of zero and a maximum value of ten, where the maximum value of ten directly correlates with the at least one data agent that requires the highest usage to launch the software application.

8. The method according to clause 1, 2, 3, 4, 5, 6 or 7, further including generating a database to store the plurality of preinstalled data agents and respective calculated data agent-specific usage scores of each data agent in the plurality of preinstalled data agent.

9. The method according to clause 1, 2, 3, 4, 5, 6, 7 or 8, further including instructing, by the processor, a computing device to display a generated database of the plurality of preinstalled data agents, where the generated database orders the plurality of data agents by each respective data agent-specific usage score.

10. A method may include:
    identifying, by a processor, at least one computing specification image within a plurality of computing specification images, where the computing specification image includes information associated with a plurality of preinstalled data agents required to launch an instance of a software application;
    monitoring, by the processor, based at least in part on the at least one identified computing specification image, each data agent within the plurality of preinstalled data agents for a predetermined period of time to establish specification a data agent usage baseline associated with each data agent within the plurality of preinstalled data agents;
    utilizing, by the processor, a chaos engineering algorithm to dynamically perturb each data agent within the plurality of preinstalled data agents, by at least:
    i) applying a plurality of predetermined stress tests to each data agent that is unique to each data agent within the plurality of preinstalled data agents,
    ii) restarting each data agent after the application of each predetermined stress test, and
    iii) detecting, in response to being restarted, a response from each data agent based on the application of each predetermined stress test;
    calculating, by the processor, a usage test score for each data agent within the plurality of preinstalled data agents based on a response to each predetermined stress test to obtain a plurality of data agent-specific usage test scores for each data agent within the plurality of preinstalled data agents;
    calculating, by the processor, an overall data agent-specific usage score associated with each data agent within the plurality of preinstalled data agents based at least in part on the plurality of data agent-specific usage test scores;
    rejecting, by the processor, at least one data agent within the plurality of preinstalled data agents from being utilized to launch the instance of the software application when specification the overall data agent-specific usage score is below the data agent usage baseline associated with the at least data agent;
    generating, by the processor, an external database to store the at least one data agent that is below the data agent usage baseline based on a calculated data agent-specific usage score of the at least one data agent in the plurality of preinstalled data agents; and
    instructing a computing device via a graphic user interface to display the external database associated with the plurality of preinstalled data agents.

11. The method according to clause 10, where at least one computing specification image within a plurality of computing specification images is associated with at least one server computing device.

12. The method according to clause 10 or 11, where the plurality of preinstalled data agents includes a plurality of instructions stored within an external data source to launch at least one software application on a computing device.

13. The method according to clause 10, 11 or 12, where monitoring each data agent within the plurality of preinstalled data agents for the predetermined period of time includes monitoring a plurality of performance metrics for a preinstalled period of time for each data agent within the plurality of preinstalled data agents,
    where the plurality of performance metrics includes CPU utilization, memory usage, and data latency measurements.

14. The method according to clause 10, 11, 12 or 13, where utilizing the chaos engineering algorithm to dynamically perturb each data agent includes applying an endpoint unavailability test, where the endpoint availability test places at least one endpoint associated the at least one data agent in an offline status.

15. A system may include:
    a non-transient computer memory, storing software instructions;
    at least one processor of a first computing device associated with a user;
    wherein, when the at least one processor executes the software instructions, the first computing device is programmed to:
        identify at least one computing specification image within a plurality of computing specification images, where the computing specification image includes information associated with a plurality of preinstalled data agents required to launch an instance of a software application;
        monitor based at least in part on the at least one identified computing specification image, each data agent within the plurality of preinstalled data agents for a predetermined period of time to establish specification a data agent usage baseline associated with each data agent within the plurality of preinstalled data agents;

utilize a chaos engineering algorithm to dynamically perturb each data agent within the plurality of preinstalled data agents, by at least:
  i) apply a plurality of predetermined stress tests to each data agent that is unique to each data agent within the plurality of preinstalled data agents,
  ii) restart each data agent after the application of each predetermined stress test, and
  iii) detect, in response to being restarted, a response from each data agent based on the application of each predetermined stress test;
calculate a usage test score for each data agent within the plurality of preinstalled data agents based on a response to each predetermined stress test to obtain a plurality of data agent-specific usage test scores for each data agent within the plurality of preinstalled data agents;
calculate an overall data agent-specific usage score associated with each data agent within the plurality of preinstalled data agents based at least in part on the plurality of data agent-specific usage test scores; and
reject at least one data agent within the plurality of preinstalled data agents from being utilized to launch the instance of the software application when specification the overall data agent-specific usage score is below the data agent usage baseline associated with the at least data agent.

16. The system according to clause 15, where at least one computing specification image within a plurality of computing specification images is associated with at least one server computing device.

17. The system according to clause 15 or 16, where the plurality of preinstalled data agents includes a plurality of instructions stored within an external data source to launch at least one software application on a computing device.

18. The system according to clause 15, 16 or 17, where the software instructions to monitor each data agent within the plurality of preinstalled data agents for the predetermined period of time include software instructions to monitor a plurality of performance metrics for a preinstalled period of time for each data agent within the plurality of preinstalled data agents,
  where the plurality of performance metrics includes CPU utilization, memory usage, and data latency measurements.

19. The system according to clause 15, 16, 17 or 18, where the software instructions to utilize the chaos engineering algorithm to dynamically perturb each data agent include software instructions to apply an endpoint unavailability test, wherein the endpoint availability test places at least one endpoint associated the at least one data agent in an offline status.

20. The system according to clause 15, 16, 17, 18 or 19, where the data agent usage baseline includes a predetermined usage threshold associated with an analysis of a utilization of the chaos engineering algorithm to determine usage ability of each data agent.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A computer-implemented method comprising:
identifying, by a processor, at least one computing specification image within a plurality of computing specification images, wherein the computing specification image comprises information associated with a plurality of preinstalled data agents required to launch an instance of a software application;
monitoring, by the processor, based at least in part on the at least one identified computing specification image, each data agent within the plurality of preinstalled data agents for a predetermined period of time to establish a data agent usage baseline associated with each data agent within the plurality of preinstalled data agents;
utilizing, by the processor, a chaos engineering algorithm to dynamically perturb each data agent within the plurality of preinstalled data agents, by at least:
  i) applying a plurality of predetermined stress tests to each data agent within the plurality of preinstalled data agents that is unique to each data agent within the plurality of preinstalled data agents,
  ii) restarting each data agent within the plurality of preinstalled data agents after the application of each predetermined stress test, and
  iii) detecting, in response to being restarted, a response from each data agent within the plurality of preinstalled data agents based on the application of each predetermined stress test;
calculating, by the processor, a usage test score for each data agent within the plurality of preinstalled data agents based on a response to each predetermined stress test to obtain a plurality of data agent-specific usage test scores for each data agent within the plurality of preinstalled data agents;
calculating, by the processor, an overall data agent-specific usage score associated with each data agent within the plurality of preinstalled data agents based at least in part on the plurality of data agent-specific usage test scores; and
rejecting, by the processor, at least one data agent within the plurality of preinstalled data agents from being utilized to launch the instance of the software application when the overall data agent-specific usage score associated with each data agent within the plurality of preinstalled data agents is below a data agent usage baseline associated with the at least one data agent.

2. The computer-implemented method of claim 1, wherein at least one computing specification image within a plurality of computing specification images is associated with at least one server computing device.

3. The computer-implemented method of claim 1, wherein the plurality of preinstalled data agents comprises a plurality of instructions stored within an external data source to launch at least one software application on a computing device.

4. The computer-implemented method of claim 1, wherein monitoring each data agent within the plurality of preinstalled data agents for the predetermined period of time comprises monitoring a plurality of performance metrics for a predetermined period of time for each data agent within the plurality of preinstalled data agents,
  wherein the plurality of performance metrics comprises CPU utilization, memory usage, and data latency measurements.

5. The computer-implemented method of claim 1, wherein utilizing the chaos engineering algorithm to dynamically perturb each data agent comprises applying an endpoint availability test, wherein the endpoint availability test places at least one endpoint associated with the at least one data agent in an offline status.

6. The computer-implemented method of claim 1, wherein the data agent usage baseline associated with the at least one data agent comprises a predetermined usage threshold associated with an analysis of a utilization of the chaos engineering algorithm to determine usage ability of each data agent.

7. The computer-implemented method of claim 1, wherein the overall data agent-specific usage score associated with each data agent comprises a usage score that is a value with a minimum value of zero and a maximum value of ten, where the maximum value of ten directly correlates with at least one data agent that requires the highest usage to launch the software application.

8. The computer-implemented method of claim 1, further comprising generating a database to store the plurality of preinstalled data agents and respective calculated data agent-specific usage scores of each data agent in the plurality of preinstalled data agents.

9. The computer-implemented method of claim 1, further comprising instructing, by the processor, a computing device to display a generated database of the plurality of preinstalled data agents, wherein the generated database orders the plurality of preinstalled data agents by each respective data agent-specific usage score.

10. A computer-implemented method comprising:
identifying, by a processor, at least one computing specification image within a plurality of computing specification images, wherein the computing specification image comprises information associated with a plurality of preinstalled data agents required to launch an instance of a software application;
monitoring, by the processor, based at least in part on the at least one identified computing specification image, each data agent within the plurality of preinstalled data agents for a predetermined period of time to establish specification a data agent usage baseline associated with each data agent within the plurality of preinstalled data agents;
utilizing, by the processor, a chaos engineering algorithm to dynamically perturb each data agent within the plurality of preinstalled data agents, by at least:
i) applying a plurality of predetermined stress tests to each data agent within the plurality of preinstalled data agents that is unique to each data agent within the plurality of preinstalled data agents,
ii) restarting each data agent within the plurality of preinstalled data agents after the application of each predetermined stress test, and
iii) detecting, in response to being restarted, a response from each data agent based on the application of each predetermined stress test;
calculating, by the processor, a usage test score for each data agent within the plurality of preinstalled data agents based on a response to each predetermined stress test to obtain a plurality of data agent-specific usage test scores for each data agent within the plurality of preinstalled data agents;
calculating, by the processor, an overall data agent-specific usage score associated with each data agent within the plurality of preinstalled data agents based at least in part on the plurality of data agent-specific usage test scores;
rejecting, by the processor, at least one data agent within the plurality of preinstalled data agents from being utilized to launch the instance of the software application when specification the overall data agent-specific usage score associated with each data agent within the plurality of preinstalled data agents is below a data agent usage baseline associated with the at least one data agent;
generating, by the processor, an external database associated with the plurality of preinstalled data agents to store at least one data agent that is below the data agent usage baseline based on a calculated data agent-specific usage score of the at least one data agent in the plurality of preinstalled data agents; and
instructing a computing device via a graphic user interface to display the external database associated with the plurality of preinstalled data agents.

11. The computer-implemented method of claim 10, wherein at least one computing specification image within a plurality of computing specification images is associated with at least one server computing device.

12. The computer-implemented method of claim 10, wherein the plurality of preinstalled data agents comprises a plurality of instructions stored within an external data source to launch at least one software application on a computing device.

13. The computer-implemented method of claim 10, wherein monitoring each data agent within the plurality of preinstalled data agents for the predetermined period of time comprises monitoring a plurality of performance metrics for a preinstalled period of time for each data agent within the plurality of preinstalled data agents,
wherein the plurality of performance metrics comprises CPU utilization, memory usage, and data latency measurements.

14. The computer-implemented method of claim 10, wherein utilizing the chaos engineering algorithm to dynamically perturb each data agent comprises applying an endpoint availability test, wherein the endpoint availability test places at least one endpoint associated with the at least one data agent in an offline status.

15. A system comprising:
a non-transient computer memory, storing software instructions;
at least one processor of a first computing device associated with a user;
wherein, when the at least one processor executes the software instructions, the first computing device is programmed to:
identify at least one computing specification image within a plurality of computing specification images, wherein the computing specification image comprises information associated with a plurality of preinstalled data agents required to launch an instance of a software application;
monitor based at least in part on the at least one identified computing specification image, each data agent within the plurality of preinstalled data agents for a predetermined period of time to establish specification a data agent usage baseline associated with each data agent within the plurality of preinstalled data agents;

utilize a chaos engineering algorithm to dynamically perturb each data agent within the plurality of preinstalled data agents, by at least:
  i) apply a plurality of predetermined stress tests to each data agent within the plurality of preinstalled data agents that is unique to each data agent within the plurality of preinstalled data agents,
  ii) restart each data agent within the plurality of preinstalled data agents after the application of each predetermined stress test, and
  iii) detect, in response to being restarted, a response from each data agent within the plurality of preinstalled data agents based on the application of each predetermined stress test;
calculate a usage test score for each data agent within the plurality of preinstalled data agents based on a response to each predetermined stress test to obtain a plurality of data agent-specific usage test scores for each data agent within the plurality of preinstalled data agents;
calculate an overall data agent-specific usage score associated with each data agent within the plurality of preinstalled data agents based at least in part on the plurality of data agent-specific usage test scores; and
reject at least one data agent within the plurality of preinstalled data agents from being utilized to launch the instance of the software application when specification the overall data agent-specific usage score associated with each data agent within the plurality of preinstalled data agents is below the data agent usage baseline associated with the at least one data agent.

16. The system of claim 15, wherein at least one computing specification image within a plurality of computing specification images is associated with at least one server computing device.

17. The system of claim 15, wherein the plurality of preinstalled data agents comprises a plurality of instructions stored within an external data source to launch at least one software application on a computing device.

18. The system of claim 15, wherein the program instructions to monitor each data agent within the plurality of preinstalled data agents for the predetermined period of time comprise program instructions to monitor a plurality of performance metrics for a preinstalled period of time for each data agent within the plurality of preinstalled data agents,
  wherein the plurality of performance metrics comprises CPU utilization, memory usage, and data latency measurements.

19. The system of claim 15, wherein the program instructions to utilize the chaos engineering algorithm to dynamically perturb each data agent comprise program instructions to apply an endpoint availability test, wherein the endpoint availability test places at least one endpoint associated with the at least one data agent in an offline status.

20. The system of claim 15, wherein the data agent usage baseline associated with the at least one data agent comprises a predetermined usage threshold associated with an analysis of a utilization of the chaos engineering algorithm to determine usage ability of each data agent.

* * * * *